(12) United States Patent
Bosch et al.

(10) Patent No.: US 9,413,886 B2
(45) Date of Patent: Aug. 9, 2016

(54) METHOD OF PROVIDING USER-DETECTABLE FEEDBACK INDICATING CHANNEL CONDITIONS

(75) Inventors: Peter Bosch, New Providence, NJ (US); Paul Anthony Polakos, Marlboro, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 1115 days.

(21) Appl. No.: 11/928,307

(22) Filed: Oct. 30, 2007

(65) Prior Publication Data

US 2009/0111460 A1    Apr. 30, 2009

(51) Int. Cl.
*H04W 4/16* (2009.01)
*H04W 68/00* (2009.01)
*H04W 76/06* (2009.01)
*H04M 3/487* (2006.01)

(52) U.S. Cl.
CPC ............ *H04M 3/4872* (2013.01); *H04W 4/16* (2013.01); *H04W 68/00* (2013.01); *H04W 76/06* (2013.01)

(58) Field of Classification Search
CPC ..... H04M 3/4872; H04W 4/16; H04W 68/00; H04W 76/06
USPC ............ 455/401, 404.1, 423, 432.1, 458–460
See application file for complete search history.

(56) References Cited

U.S. PATENT DOCUMENTS

| | | | |
|---|---|---|---|
| 5,995,830 A * | 11/1999 | Amin et al. ................... | 455/423 |
| 6,246,872 B1 * | 6/2001 | Lee et al. ................... | 455/414.1 |
| 7,532,581 B1 * | 5/2009 | Metzger et al. ............... | 370/252 |
| 7,571,317 B1 * | 8/2009 | Vilhuber ........................ | 713/161 |
| 2002/0123309 A1 * | 9/2002 | Collier et al. ................ | 455/67.1 |
| 2005/0202849 A1 * | 9/2005 | Ignatin .......................... | 455/564 |
| 2007/0129022 A1 * | 6/2007 | Boillot et al. ................ | 455/90.1 |
| 2008/0186957 A1 * | 8/2008 | Lai ................................ | 370/356 |

* cited by examiner

*Primary Examiner* — George Eng
*Assistant Examiner* — Marcus Hammonds
(74) *Attorney, Agent, or Firm* — Davidson Sheehan LLP

(57) ABSTRACT

The present invention provides a method for implementation in a first mobile unit that supports an air interface with a network element. The method includes determining, while the first mobile unit is participating in a call, that at least one channel associated with the air interface is unable to support voice transmission. The method also includes rendering a first user-detectable signal in response to determining that said at least one channel is unable to support voice transmission.

22 Claims, 3 Drawing Sheets

METHOD OF PROVIDING USER-DETECTABLE FEEDBACK INDICATING CHANNEL CONDITIONS

BACKGROUND OF THE INVENTION

1. Field of the Invention

This invention relates generally to communication systems, and, more particularly, to wireless communication systems.

2. Description of the Related Art

Conventional wireless communication systems use a network of base stations or other access points to provide wireless connectivity to one or more mobile units. A mobile unit and the base station may establish communication over a wireless communication link or air interface. The wireless communication link may be used to exchange information such as voice packets exchanged by the mobile unit and another user in the wireless communication system. The channel conditions over the wireless communication link typically vary due to a wide variety of factors including changes in environmental conditions, movement of the mobile unit, interference with other radiofrequency transmissions or noise, and the like. In some cases, the channel conditions can deteriorate to such an extent that the wireless communication link is no longer able to carry voice packets or other information. Since the mobile units at either end of the call are not receiving voice packets, they render silence over the speakers or earphones of the mobile unit. Users of the mobile units are therefore unable to determine whether or not silences occur because another user has stopped speaking or because the channel quality has deteriorated.

Calls over wireless communication links may be dropped when the channel quality of the wireless communication link remains too low to support communication for a selected period of time. Calls may also be dropped for a other reasons that are not necessarily related to channel quality. For example, a call may be dropped due to a failure in the network signaling sequence during a handover or other mobility-related event. The wireless communication systems and the mobile units may clear the dropped call so that one of the users must manually re-establish the call (e.g., by redialing the other user) if the user wishes to continue the call. This approach has a number of disadvantages. For example, the parties in the call cannot determine whether the call was dropped because of poor channel conditions or because the other user intentionally terminated the call. For another example, redialing the call is tedious and may cause user frustration, particularly if one of the users is in a region with relatively weak coverage and the call is repeatedly dropped. For yet another example, neither of the parties in the call will know whether we should attempt to redial the other party or whether they should await a redial attempt from the other party when a call is dropped. This may lead to a delay in reestablishing the call, a collision between incoming and outgoing calls (which may in turn lead to one or both parties being directed to the other party's voicemail box), or other undesirable complications.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for implementation in a first mobile unit that supports an air interface with a network element. The method includes determining, while the first mobile unit is participating in a call, that at least one channel associated with the air interface is unable to support voice transmission. The method also includes rendering a first user-detectable signal in response to determining that said at least one channel is unable to support voice transmission.

In another embodiment of the present invention, a method is provided for implementation in a network element that supports an air interface with a first mobile unit. The method includes determining, at the network element during a call involving the first mobile unit, that at least one channel associated with the air interface is unable to support voice transmission. The method also includes transmitting, from the network element and in response to determining that the channel is unable to support voice transmission, information indicative of a first audible signal to a second termination point of the call so that the second termination point can render the first user-detectable signal.

BRIEF DESCRIPTION OF THE DRAWINGS

The invention may be understood by reference to the following description taken in conjunction with the accompanying drawings, in which like reference numerals identify like elements, and in which.

Figure 1:
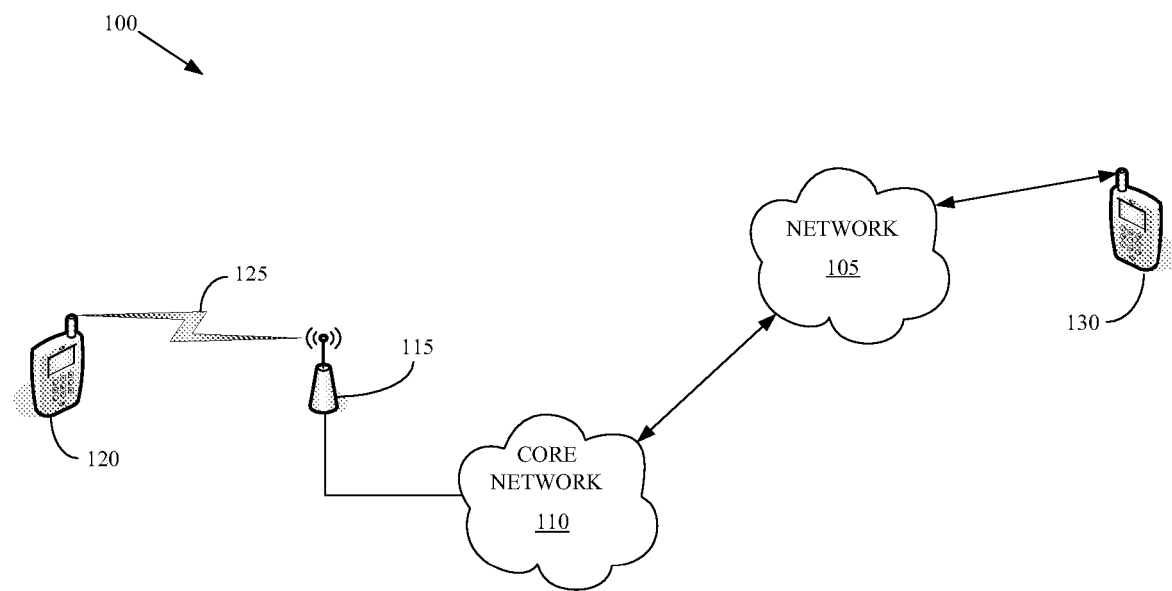
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a network 105 that is communicatively coupled to a core network 110. The network 105 and/or the core network 110 support packet-switched communication according to a one or more standards and/or protocols. The particular standards and/or protocols that are used to support the packet-switched communication over the network 105 and/or the core network 110 are a matter of design choice and not material to the present invention. Furthermore, in alternative embodiments, the network 105 and/or the core network 110 may also support circuit-switched communication.

The core network 110 is communicatively coupled to one or more network elements 115 that are configured to provide wireless connectivity to mobile units 120 over an air interface 125. In the illustrated embodiment, the network element 115 is a radio access network 115 that provides wireless connectivity to the mobile unit 120 over the air interface 125. The mobile unit 120 may then establish a call session over the air interface. For example, the mobile unit 120 may initiate a call to another end-user device such as the mobile unit 130. A call session may then be established between the mobile unit 120 and the radio access network 115 over the air interface 125. The radio access network 115 may also establish a call connection with the end-user device 130 using the core network 110 and the network 105. Once the wireless and/or wired call connection has been formed, users of the mobile unit 120 and the end-user device 130 may communicate, e.g. by exchanging voice packets according to a Voiceover Internet Protocol (VoIP). Techniques for initiating, establishing, and/or terminating the wireless communication link or air interface, the call session, and the call connection are known in the art and in the interest of clarity only those aspects of these functions that are related to the present invention will be discussed herein.

The radio access network 115 may be implemented in one or more entities. In one embodiment, the radio access network 115 may include one or more base stations (not shown) that are in communication with a radio network controller (not shown). This configuration is typically referred to as a hierarchical wireless communication system 100. The base stations are typically responsible for handling, among other things, the layer-1 functionality of the radio access network 115 and the radio network controllers are responsible for handling, among other things, the layer-3 functionality of the radio access network 115. As one example of the operation of a hierarchical wireless syndication system 100, the system 100 may initiate communication with the target mobile unit 120 when a server (not shown) transmits voice and/or data destined for a target mobile unit 120 to a central element such as such as the radio network controller (RNC). The RNC may then transmit paging messages to the target mobile unit 120 via one or more base stations. The target mobile unit 120 may establish a wireless link 125 to one or more of the base stations in response to receiving the page from the wireless communication system 100. A radio resource management function within the RNC receives the voice and/or data and coordinates the radio and time resources used by the set of base stations to transmit the information to the target mobile unit 120. The radio resource management function can perform fine grain control to allocate and release resources for broadcast transmission over a set of base stations.

One alternative to the conventional hierarchical network architecture is a distributed architecture including a network of access points, such as base station routers, that implement distributed communication network functionality. The base station routers are typically responsible for handling, among other things, the layer-1, layer-2 and layer-3 functionality of the radio access network 115. For example, the radio access network 115 may include base station routers that combine RNC, MSC, SGSN, GGSN and/or PDSN functions in a single entity that manages radio links between one or more mobile units 120 and an outside network 105, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies by through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

Channels of the air interface may become unable to support voice communication. For example, voice packets may not be transmitted over the air interface 125 when the channel conditions and/or channel quality of the communication channels carried by the air interface 125 between the mobile unit 120 and the radio access network 115 deteriorate. However, the absence of voice packets may also be due to a true silence, e.g., because one of the users is not speaking. The mobile unit 120 and/or the radio access network 115 may therefore include functionality to determine when the absence of voice packets is caused by deterioration of the channel conditions. For example, the mobile unit 120 and the radio access network 115 may monitor and/or measure quantities such as a signal-to-noise ratio, a signal-to-interference-plus-noise ratio, a bit error rate, a pilot signal strength, and the like. These measurements may then be used to determine whether voice packets can be transmitted over the air interface 125. In one embodiment, layer-1 functionality in the mobile unit 120 and/or the radio access network 115 may access the channel condition information and use this information to determine whether the absence of received packets is due to a true silence on the line or caused by poor channel conditions. For example, in UMTS, both the radio access network 115 and the mobile unit 120 transmit a pilot channel in the voice bearer. The inability to receive this pilot channel at the radio access network 115 and/or the mobile unit 120 is an indicator that the channel conditions are too weak to carry voice signals. For another example, the signal-to-noise ratio of the wireless communication path can be measured and when this value falls below a selected threshold signal the channel is too poor to carry voice signals.

When the mobile unit 120 determines that the channel quality is too poor to support voice transmissions, it may render a user-detectable signal. In one embodiment, the user-detectable signal may be a synthesized audio stream that is rendered to a speaker. The synthesized audio stream may play a message, a tone, or other audible signal that the user will recognize as indicating that the air interface 125 cannot currently support voice transmissions. For example, layer-1 functionality may provide a signal to the layer-3 functionality in the mobile unit 120 that indicates that the layer-3 functionality should generate the synthesized audio stream and use this stream to render an audible signal. In various alternative embodiments, the audible signal may be a pre-selected signal or a user-selected signal that may be indicated in a user profile. Furthermore, persons of ordinary skill in the art having benefit of the present disclosure should appreciate that the present invention is not limited to audible user-detectable signals. In alternative embodiments, other user-detectable signals may be used to indicate the deterioration of the channel quality. For example, the mobile unit 120 may render other user-detectable signals such as visual signals, tactile signals like vibration, and the like. These user-detectable signals may be rendered in conjunction with the audible signal or instead of the audible signal.

Similarly, when the radio access network 115 determines that the channel quality is too poor to support voice transmissions, it may insert a data stream representative of a user-detectable signal (such as a synthesized audio stream) into the voice communication data stream destined for the other end-user device 130. The synthesized audio stream may be used by the end-user device 130 render an audible signal that the user of the end-user device 130 will recognize as indicating that the air interface 125 cannot currently support voice transmissions. However, as discussed above, the inserted data stream is not limited to information that can be used to generate an audible signal and an alternative embodiments the data stream may include information that can be used to generate any type of user-detectable signal. In embodiments of a distributed wireless communication system 100, layer-1 functionality in the base station router of the radio access network 115 may provide a signal to the layer-3 functionality within the same base station router that indicates that the layer-3 functionality should generate the synthesized audio stream and transmit the signal to the end-user device 130. Alternatively, in embodiments of a hierarchical wireless communication system 100, layer-1 functionality in the base station of the radio access network 115 may provide a signal to the layer-2 and layer-3 functionality in the radio network controller that indicates that the radio network controller should generate the synthesized audio stream and transmit the signal to the end-user device 130.

Call drops and, in some cases, re-establishment of the call may also be indicated by user-detectable signals that are rendered to the users of the mobile unit 120 and/or the end-user device 130. In one embodiment, the mobile unit 120 may render an audible signal when it determines that a call has been dropped because of deterioration of the channel conditions, errors in network signaling, or other reasons. The audible signal generated in response to a call drop may be different than the audible signal generated in response to low channel quality so that the users understand that the audible signal indicates that the call has been dropped. Similarly, the radio access network 115 may generate a synthesized audio data stream when it determines that the call has been dropped. The synthesized audio data stream may be transmitted to the end-user device 130, which may use this data to render the audible signal indicating the call drop. In one embodiment, the radio access network 115 may attempt to reestablish the call with the mobile unit 120. Audible signals indicating the attempted re-establishment and, if successful, re-establishment of the call may also be generated by the mobile unit 120 and/or the radio access network 115. As discussed herein, the user-detectable signals are not limited to audible signals.

Figure 2:
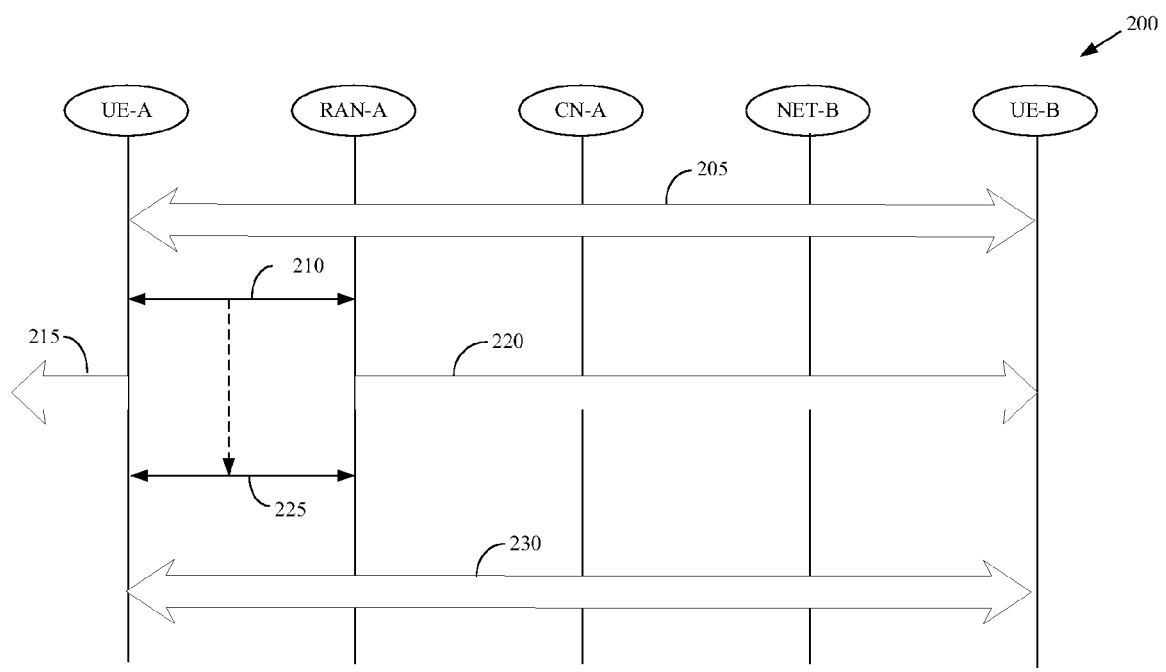
FIG. 2 conceptually illustrates one exemplary embodiment of a method of providing user-detectable feedback that indicates poor channel conditions, in accordance with the present invention.

FIG. 2 conceptually illustrates one exemplary embodiment of a method 200 of providing audible feedback that indicates poor channel conditions. Although the method 200 is discussed in the context of a system that only provides audible feedback, persons of ordinary skill in the art having benefit of the present disclosure should appreciate that this exemplary embodiment is intended to be illustrative and not to limit the present invention to audible feedback. Other embodiments of the method 200 may use other types of user-detectable signals such as visual signals, tactile signals, and the like. In the illustrated embodiment, a call is set up between a first user equipment (UE-A) and a second user equipment (UE-B) over an air interface between the first user equipment and a radio access network (RAN-A). The radio access network communicates with the second user equipment over a core network (CN-A) and another network (NET-B). Once the call has been set up, the first and second user equipment can exchange voice packets over the call connection, as indicated by the double-headed arrow 205. In the illustrated embodiment, the first user equipment and the radio access network determine (at 210) that the channel conditions over the air interface are insufficient to support voice communication.

In response to determining that the channel conditions over the air interface cannot support voice communication, a first audible signal may be generated to indicate the poor channel conditions, as well as to indicate that the call has not been dropped. For example, the first user equipment renders a first audible signal to the user of the first user equipment, as indicated by the arrow 215. The radio access network also generates audio data and inserts this data into the data stream carrying voice information associated with the call to the second user equipment, as indicated by the arrow 220. The second user equipment receives a generated audio data and uses this data to render an audible signal to the user of the second user equipment. In one embodiment, the audible signals may be generated for substantially the entire time that the channel conditions over the air interface are insufficient to support voice communication. Alternatively, short signals and/or messages may be rendered periodically to indicate that the channel conditions over the air interface remain insufficient to support voice communication, but that the call has not been dropped. For example, a series of tones or other user-detectable signals (like flashing lights or pulsed vibrations) may be transmitted with a short period of silence between each tone.

The channel conditions over the air interface may improve so that voice communication can again be supported. In the illustrated embodiment, the first user equipment and the radio access network determine (at 230) that the channel conditions over the air interface permit voice communication. The first user equipment and the radio access network may then stop generating the first audible signal and exchange of voice packets between the first and second user equipment may resume, as indicated by the double-headed arrow 235.

Figure 3:
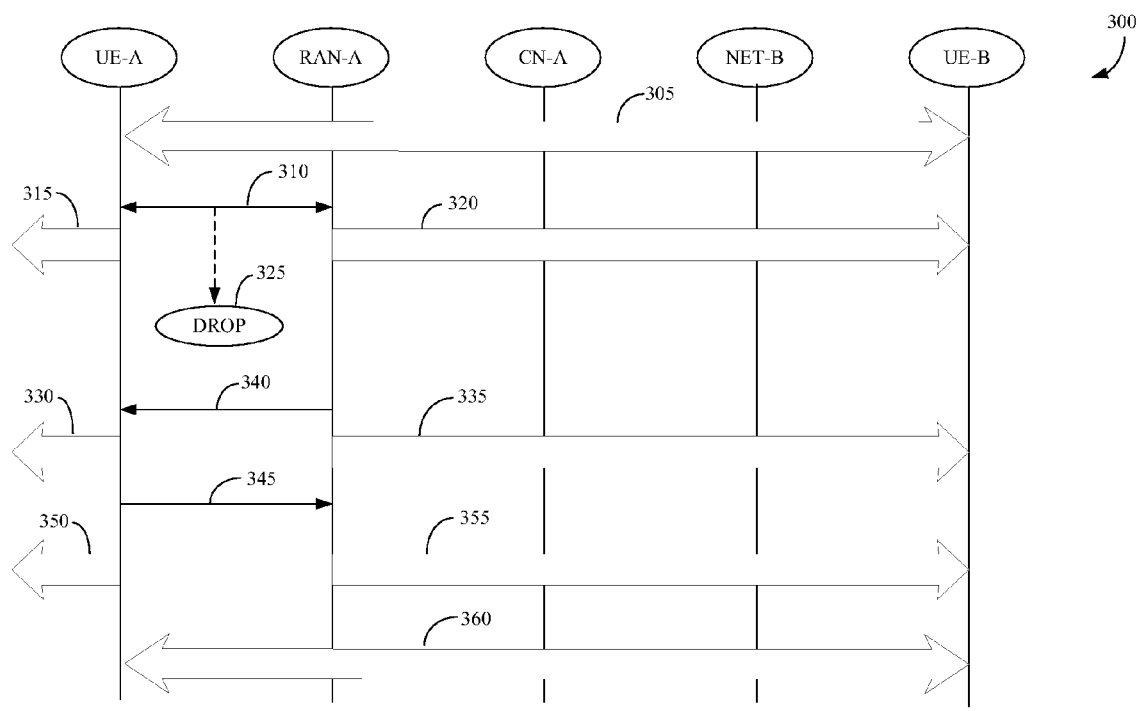
FIG. 3 conceptually illustrates one exemplary embodiment of a method of providing user-detectable feedback that indicates a dropped call, in accordance with the present invention.

FIG. 3 conceptually illustrates one exemplary embodiment of a method 300 of providing audible feedback that indicates a dropped call. Although the method 300 is discussed in the context of a system that only provides audible feedback, persons of ordinary skill in the art having benefit of the present disclosure should appreciate that this exemplary embodiment is intended to be illustrative and not to limit the present invention to audible feedback. Other embodiments of the method 300 may use other types of user-detectable signals such as visual signals, tactile signals, and the like. In the illustrated embodiment, a call is set up between a first user equipment (UE-A) and a second user equipment (UE-B) over an air interface between the first user equipment and a radio access network (RAN-A). The radio access network communicates with the second user equipment over a core network (CN-A) and another network (NET-B). Once the call has been set up, the first and second user equipment can exchange voice packets over the call connection, as indicated by the double-headed arrow 305. In the illustrated embodiment, the first user equipment and the radio access network determine (at 310) that the channel conditions over the air interface are insufficient to support voice communication. In response to determining that the channel conditions over the air interface cannot support voice communication, a first audible signal may be generated to indicate the poor channel conditions. For example, the first user equipment renders a first audible signal to the user of the first user equipment, as indicated by the arrow 315, and the radio access network generates audio data and inserts this data into the data stream carrying voice information associated with the call to the second user equipment, as indicated by the arrow 320.

The call over the air interface between the first user equipment and the radio access network may be dropped (at 325). In one embodiment, the call has been successfully established (or handed off) using existing communication channels. For example, the call may be dropped (at 325) due to further deterioration of the channel conditions and/or due to persistence of the poor channel conditions for a predetermined time. Alternatively, the call drop may be caused by a failure during channel set up, such as a failure to allocate the required resources in a target cell during a mobility handover. The call drop may also be caused by inappropriate or accidental deletion of the call or de-allocation of the channel resources. The first user equipment can render (at 330) a second audible signal once the first equipment determines that the channel has been dropped. In one embodiment, the second audible signal is selected to be distinct from the first audible signal so that the user of the first user equipment will know that the poor channel conditions have caused the call to be dropped (at 325). The radio access network may also generate a synthesized audio data stream that can be transmitted to the second user equipment (at 335) and used to render the second audible signal to the user of the second user equipment.

The wireless communication system may also automatically attempt to re-establish the dropped call. In the illustrated embodiment, the radio access network transmits (at 340) a page message to the first user equipment when the radio access network determines that the call has been dropped (at 325). Alternatively, the first user equipment may be configured to attempt to re-establish the call without receiving a page. The radio access network and the first user equipment should agree on a protocol for determining which entity will attempt to re-establish the call to avoid redundant attempts and/or collisions between attempts. Although FIG. 3 depicts the paging message (at 340) as being transmitted before the second audible signal (at 330, 335), persons of ordinary skill in the art having benefit of the present disclosure should appreciate that the present invention is not limited to this sequence of events. In alternative embodiments, generation and/or rendering of the second audible signal (at 330, 335) and transmission of the paging message (at 340) may occur in any order and/or concurrently.

If the first user equipment successfully receives the paging message (at 340), which may indicate that the channel conditions have improved sufficiently to support them indication over the air interface, the first user equipment may transmit (at 345) a response to the paging message. Upon successful receipt of the response, the radio access network may initiate re-establishment of the previously dropped call session. The first user equipment may also render (at 350) a third audible signal to indicate that the radio access network is attempting to re-establish the previously dropped call session. In one embodiment, the third audible signal is selected to be distinct from the first and second audible signals so that the user of the first user equipment will know that the radio access network is attempting to reestablish the dropped call session. The radio access network may also generate a synthesized audio data stream that can be transmitted to the second user equipment (at 355) and used to render the third audible signal to the user of the second user equipment.

The first user equipment maintains the call state for the dropped call so that the call may be continued if the previously dropped call session can be reestablished. Once the previously dropped call session has been reestablished over the air interface between the first user equipment and the radio access network, the first user equipment may associate the reestablished call session with the call state and the user may resume exchanging voice information with the second user equipment, as indicated by the double headed arrow 360.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method comprising:
    determining, at a first mobile unit, that voice packets are not being received at the first mobile unit over at least one channel associated with an air interface because channel quality of said at least one channel has deteriorated so that said at least one channel is unable to support transmission of voice packets, wherein deterioration of said at least one channel is indicated by at least one of a signal-to-noise ratio, a signal-to-interference-plus-noise ratio, a bit error rate, and a pilot signal strength measured by the first mobile unit for signals received over the air interface; and
    rendering a first user-detectable signal in response to determining that voice packets are not being received at the first mobile unit over said at least one channel because said at least one channel is unable to support transmission of voice packets, wherein the first user-detectable signal is rendered while said channel quality is sufficient to maintain said at least one channel and while said at least one channel remains unable to support transmission of voice packets.

2. The method of claim 1, wherein determining that said at least one channel is unable to support transmission of voice packets comprises performing, at the first mobile unit, at least one measurement indicative of at least one channel condition and determining that said at least one channel is unable to support transmission of voice packets based upon said at least one measurement.

3. The method of claim 2, wherein determining that said at least one channel is unable to support transmission of voice packets comprises determining said at least one channel condition using layer-1 functionality in the first mobile unit.

4. The method of claim 1, wherein rendering the first user-detectable signal comprises rendering at least one of an audible signal, or a tactile signal.

5. The method of claim 4, wherein rendering the first user-detectable signal comprises rendering the first user-detectable signal substantially continuously while said at least one channel condition remains unable to support transmission of voice packets and said channel quality is sufficient to maintain said at least one channel.

6. The method of claim 1, comprising determining, at the first mobile unit, that a call session has been dropped due to at least one of a channel condition being insufficient to support transmission of voice packets for a selected period of time, failure to successfully establish the call, failure to allocate resources, deletion of the call, or de-allocation of one or more call resources.

7. The method of claim 6, comprising rendering a second user-detectable signal, different than the first user-detectable signal, in response to determining that the call has been dropped.

8. The method of claim 7, wherein rendering the second user-detectable signal comprises rendering at least one of an audible signal, a visual signal, or a tactile signal.

9. The method of claim 7, comprising receiving, at the first mobile unit, a paging signal from a network element in response to the call being dropped.

10. The method of claim 9, comprising providing a response to the paging signal and rendering a third user-detectable signal, different than the first and second user-detectable signals, in response to providing the response to the paging signal.

11. The method of claim 10, wherein rendering the third user-detectable signal comprises rendering at least one of an audible signal, a visual signal, or a tactile signal.

12. The method of claim 10, comprising reestablishing the call between the first mobile unit and the network element.

13. A method, comprising:
    determining, at a network element, that channel quality of at least one channel over an air interface between the network element and a first mobile unit has deteriorated so that said at least one channel is unable to support transmission of voice packets for a call, wherein deterioration of said at least one channel is indicated by at least one of a signal-to-noise ratio, a signal-to-interference-plus-noise ratio, a bit error rate, and a pilot signal strength measured by the network element for signals received over the air interface; and
    transmitting, from the network element and in response to determining that said at least one channel is unable to support transmission of voice packets, information indicative of a first user-detectable signal to a second termination point of the call so that the second termination point can render the first user-detectable signal, wherein the network element transmits the first user-detectable signal while said channel quality is sufficient to maintain said at least one channel and while said at least one channel remains unable to support transmission of voice packets.

14. The method of claim 13, wherein determining that said at least one channel is unable to support transmission of voice packets comprises performing, at the network element, at least one measurement indicative of said at least one channel condition and determining that said at least one channel is unable to support transmission of voice packets based upon said at least one measurement.

15. The method of claim 14, wherein determining that said at least one channel is unable to support transmission of voice packets comprises determining said at least one channel condition using layer-1 functionality in the network element.

16. The method of claim 13, wherein transmitting the information indicative of the first user-detectable signal comprises transmitting information usable by the second termination point to render the first user-detectable signal substantially continuously while said at least one channel remains unable to support voice transmission and said channel quality is sufficient to maintain said at least one channel.

17. The method of claim 13, comprising determining, at the network element, that the call has been dropped due to at least one of a channel condition being insufficient to support transmission of voice packets for a selected period of time, failure to successfully establish the call, failure to allocate resources, deletion of the call, or de-allocation of one or more call resources.

18. The method of claim 17, comprising transmitting information indicative of a second user-detectable signal, different than the first user-detectable signal, to the second termination point in response to determining that the call has been dropped.

19. The method of claim 18, comprising transmitting, to the first mobile unit, a paging signal in response to the call being dropped.

20. The method of claim 19, comprising receiving a response to the paging signal and transmitting information indicative of a third user-detectable signal, different than the first and second user-detectable signals, to the second termination point in response to receiving the response to the paging signal.

21. The method of claim 20, wherein rendering at least one of the first, second, and third user-detectable signals comprises rendering at least one of an audible signal, a visual signal, or a tactile signal.

22. The method of claim 20, comprising reestablishing the call between the first mobile unit and the second termination point.

\* \* \* \* \*